J. MASSARELLA.
CONFECTIONERY COATING MACHINE.
APPLICATION FILED JAN. 31, 1920.
1,417,086.
Patented May 23, 1922.
2 SHEETS—SHEET 2.
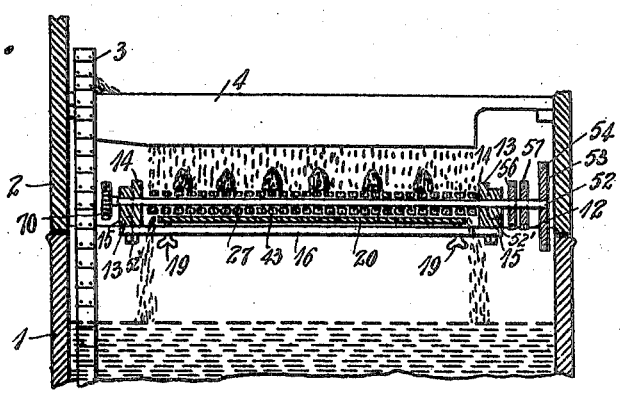
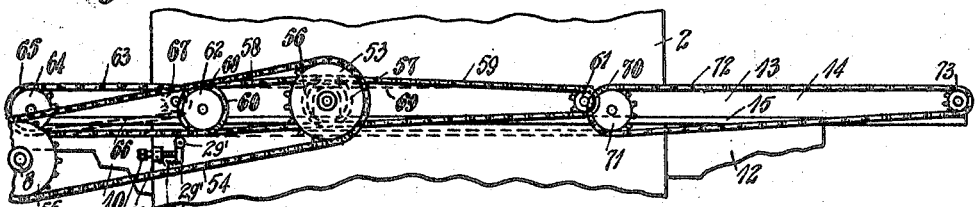
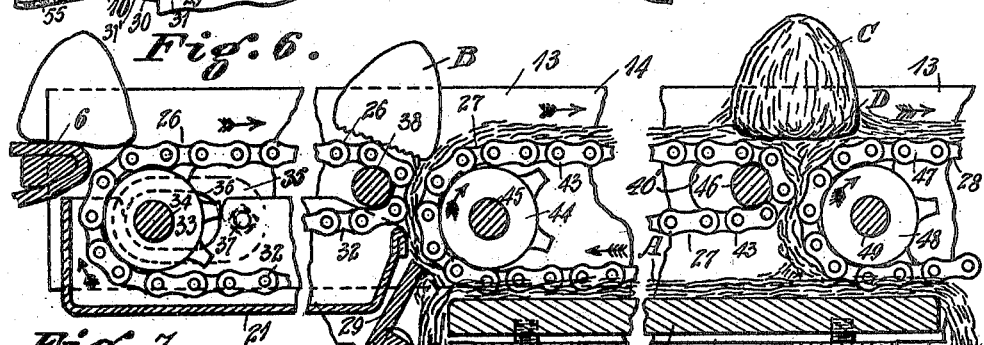
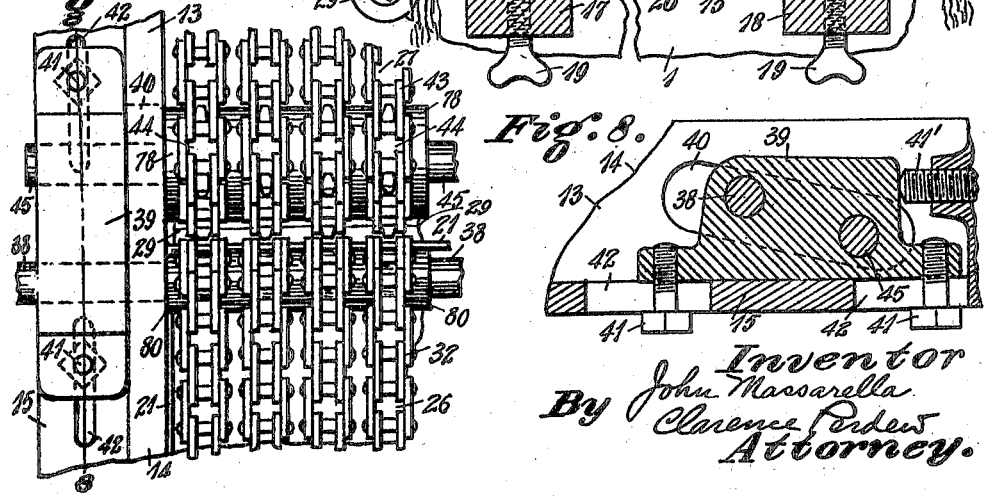

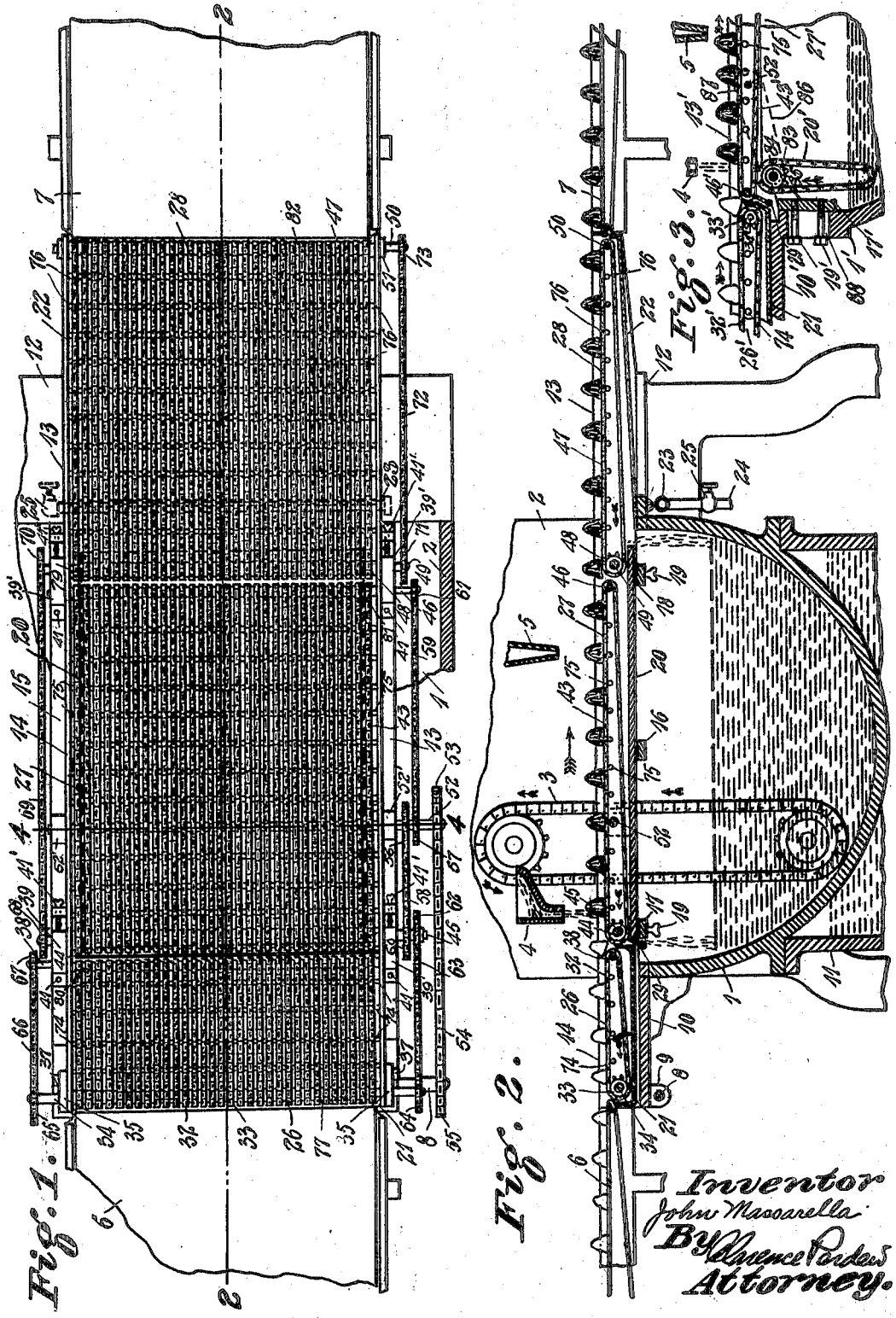

UNITED STATES PATENT OFFICE.

JOHN MASSARELLA, OF CINCINNATI, OHIO.

CONFECTIONERY-COATING MACHINE.

1,417,086. Specification of Letters Patent. Patented May 23, 1922.

Application filed January 31, 1920. Serial No. 355,531.

*To all whom it may concern:*

Be it known that I, JOHN MASSARELLA, a citizen of the United States, residing at Cincinnati, in the county of Hamilton and State of Ohio, have invented certain new and useful Improvements in Confectionery-Coating Machines, of which the following is a specification.

My invention relates to confectionery machinery; and the objects of my improvement are to increase the durability and reliability of machines of this kind, to make them more uniform and effective in their operation, especially in coating the under sides of the pieces of confectionery, to permit of accurate regulation of the coating operation, and to insure a cleaner and neater product. Other objects will appear in the course of the ensuing description.

I attain these objects by the mechanism illustrated, for example, in the accompanying drawings, in which—

Figure 1 is a plan view of parts of a confectionery-coating machine embodying my invention;

Fig. 2 is a vertical longitudinal section of the same, on a plane corresponding to the line 2—2 of Fig. 1;

Fig. 3 is a partial section corresponding to Fig. 2, illustrating a modification of the distributing means;

Fig. 4 is a vertical cross-section of the machine of Figs. 1 and 2, on a plane corresponding to the line 4—4 of Fig. 1;

Fig. 5 is a side elevation of the same, the near side of the machine frame being omitted to reveal the interior construction;

Fig. 6 is an enlarged section corresponding to that of Fig. 2, with intermediate parts omitted for lack of space;

Fig. 7 is a partial plan view corresponding to Fig. 1, enlarged to the scale of Fig. 6; and Fig. 8 is a vertical longitudinal section on a plane corresponding to the line 8—8 of Fig. 7.

As is common in machines of this character, there is a lower reservoir or tank 1 between the two frame sides 2 (Fig. 4) which holds a supply of coating material, chocolate for instance, in suitable liquid or viscous consistency, which is elevated constantly by the elevator or carrier 3 into a suitable trough 4 having an outlet from which the coating material falls onto the candy or other confection passed thereunder. As shown in Fig. 2, these pass thereunder from left to right, and some distance to the right of the coating-material outlet is the nozzle 5 through which air is forced against the confection, blowing off excess coating, as is well known in the art. There are also the well known conveyor belts 6 and 7, at the left and right to deliver the confections to and from the machine, respectively.

It will be understood that the elevator 3, the air forcing means for the nozzle 5, and the delivery belts 6 and 7 are all driven by suitable mechanisms, which may be any of the various kinds which the prior art affords, and which, therefore, need not be more particularly disclosed herein. Likewise with the main driving shaft 8, journaled in bearings 9 on the underside of the outer end part of the trough-bracket 10 at the left end of the machine; it being understood that this and the other mechanisms are driven simultaneously and at properly regulated speeds, either uniform relatively to each other, or with means for varying some or all of the speeds of the respective mechanisms, as may be required under the varying conditions familiar to those skilled in confectionery-coating. Also, where chocolate and some other coating materials are used, means is provided for keeping the coating material at the right temperature to maintain its proper consistency, as for instance the water-bath tank 11, part of which is shown, below the coating-material tank 1 in Fig. 2. These parts of the machine are disclosed merely to elucidate the following description of my improvements as combined therewith.

Supported upon the bracket 10 at the left end, and upon frame extensions 12 at the right end of the machine, are the parallel conveyor-frame bars 13, spaced in some distance from the frame sides 2; the elevator or carrier 3 for the coating material passing up through the space thus left at the left-hand side (Fig. 4). Each bar preferably is of cross-section comprising an upright member 14 and a narrower outwardly extending member or flange 15 at the bottom of the member 14. Cross-bars 16, 17 and 18 have their end parts fixed to the bottoms of these flanges 15 and extend across from one bar 13 to the other at about the middle and short distances in from the ends of the coating-material tank 1, respectively. These bind the bars 13 together and stiffen the conveyor-frame; and in addition, the end bars 17 and 18 have adjusting screws 19 up through them, with the screw ends entering sockets in the under side of the flat distributing-plate 20, which is thus supported for up-and-down adjustment and extends uninterruptedly across the major part of the top of the tank 1, but has its ends and sides spaced material distances in from the tank ends (Fig. 2) and from the frame bars 13 (Fig. 4).

At the left end, supported by the bracket 10, is the dust-pan 21, extending from one frame-bar 13 to the other and from the outer end of the bracket 10 to within a short distance of the end of the distributing plate 20. At the right end, supported on the frame extensions 12, is the drip-trough 22, extending from one bar 13 to the other and from the right ends of these bars to the adjacent end of the coating-material tank 1, toward which it is materially downwardly inclined. This inner end of this drip-trough is open, allowing drippings to pass into the tank 1; but the inner end of the dust-pan, at the other end of the machine, is closed, excluding the dust from the tank 1. Under the drip-trough 22, near its inner end, the heater 23 extends across, preferably with a thicker part intervening, to temper the effect; it being the purpose of this heater 23 to keep the drip-trough only moderately warm. As shown, this heater is a tubular gas-burner, supplied through a pipe 24, controlled by a valve 25 at one side (Figs. 1 and 2.)

The conveyer propelling means is in three sections, 26, 27 and 28, preferably of a series of parallel sprocket chains of stud-and-link construction like those used for bicycles, although they need not be quite so heavy nor of such expensive material as such chains usually are.

The three sections just mentioned correspond, respectively, to the dust-pan 21, the distributing plate 20, and the drip-trough 22; the first section 26 running close to the feed belt 6 and to the adjacent end of the second section 27, receiving confections from the former and delivering them to the latter; and the second section 27 carrying the confections under the coating-material trough or fountain 4 and under the air-nozzle 5, and running close to the adjacent end of the third section 28, which receives the confections from the second section and carries them over the drip-trough 22 to the delivery belt 7 by running close to the adjacent end of this belt.

The second section 27 and the third section 28 of the conveyor pass close to the upper surface of the distributing plate 20; the third section meeting the main section 27 a material distance inward or to the left from the adjacent end of the distributing plate 20, for this purpose.

A gate or gauge 29 extends across just to the left of the left end of the distributing plate 20, with its upper edge close to the conveyor section 27 where it passes up. To vary the distance of this edge of the gate 29 from the conveyor section 27, this gate is supported on a pivot element 29' that is journaled in the conveyor frame and has outside thereof an arm 29'' (Fig. 5) connected to a fixed lug 30 by a tension spring 31 that keeps the gate pulled toward the conveyor section 27, while an adjusting screw 31', passed through the lug 30 against the arm 29'', forces the gate away from the conveyor section 27. The adjacent end of the dust-pan 21 is set back to admit this gate, but the upper edge of this end extends as close up as may be, between the adjacent ends of the conveyor sections 26 and 27.

This gate or gauge 29 and the adjustment of the plate 20 regulate the thickness of coating on the chains, as the adjusting screw keeps the gate the required distance away from the conveyor element. The initial adherence of the coating to the conveyor element is controlled by raising and lowering the distributing plate 20 by means of the adjusting screws 19.

In addition to this novel relation of the conveying element to the other parts, as just described, I provide for more firmness and accuracy of support of the confections and for greater durability of the moving parts of the conveyor by making them up of a series of parallel sprocket chains running around respective ones of gangs of sprocket wheels on a driving shaft, and around a suitable rotary means at the other end of the conveyor section; these chains being kept tight, preferably by providing for increasing the distance between the sprocket-wheel shaft and the rotary means. This is the improvement in conveyor structure before alluded to. Each one of the conveyor sections referred to herein is preferably made up in this manner.

Thus, the first or dusting section is made up of the chains 32 around sprocket wheels 33 on the shaft 34 journaled in bushings 35 mounted in short longitudinal slots 36 in the end parts of the bars 13 and held in adjusted position by set screws 37. At the other end of the section, these chains pass around a roller shaft 38 journaled in a bearing-block 39 on the outer flange of each bar 13, passing through slots 40 in the bars to enter these bearing-blocks; while these bearing-blocks are longitudinally adjustable on these flanges by having clamping screws 41 passing up through longitudinal slots 42 in the flanges, into the bottoms of the blocks. Adjusting screws 41' force the blocks to the left.

The middle or main section is similarly made up of the chains 43 passing around sprocket wheels 44 on the shaft 45 journaled also in the bearing blocks 39 into which blocks the shaft 45 extends through the slots 40 (Fig. 8) so that this end of the section may be adjusted to left or right along the conveyor frame. At the other end of the section, these chains pass around the roller shaft 46, journaled in another pair of blocks 39' like the blocks 39, into which blocks the shaft 46 extends through other slots 40', like the slots 40, with clamping screws 41 and adjusting screws 41'.

The third or cooling or hardening section of the conveyor comprises the chains 47 passing around sprocket wheels 48 on the shaft 49 journaled also in the blocks 39', into which blocks the shaft 49 passes through the slots 40'. Thus this end of the third section may be adjusted along the conveyor frame. At the other end of this section, these chains 47 pass around the roller shaft 50, which is simply journaled in stationary bushings 51 fixed in the end parts of the conveyor frame bars 13.

With the bearing blocks 39 and 39' and the bushings 35 of the dusting section adjustable as just described, it is thus possible to stretch the chains tightly, so that the upper stretches are practically straight, although the driving tension comes on the lower stretches as a result of driving the chains by rotating the sprocket wheels, the roller shafts merely acting as guides and, if driven at all, being so driven merely to avoid undue friction of the chains passing therearound. The reason for arranging the driving sprocket wheels at the left ends of the sections, when the upper stretches must travel to the right, is that the relatively large sprocket wheels may be employed adjacent to the feed belt 6 at the left end of the machine, where abrasion of the confection center bottom, (Fig. 6) by the rubbing of the belt thereon incident to slight droppage and retarding in the gap between the feed belt and the sprocket wheel, is beneficial rather than detrimental. A desirable slight roughening of the bottom is thus caused, permitting better adherence of the coating. This also occurs at the passage from the dusting section to the main section, (B, Fig. 6) by the rubbing of the links of the chains 32 on the confection bottom. Where the coated confection passes from the final cooling or hardening section onto the delivery belt 7 or the plaque thereon, it is desirable that its bottom, now coated, should be subjected to practically no abrasion, and therefore the relatively narrow roller shaft is used at this end, so that it can carry the chains very close to the delivery belt 7 and avoid the gap that exists between the sprocket wheels and the feed belt 6 and between the sections 26 and 27.

All of the wheels, of course, are made as small as they may be and yet exert sufficient driving power on the chains. By keeping the chains stretched tight it is practical to have these driving sprocket wheels at the left of the respective sections while driving to the right. This arrangement also brings the lowest travel of the main-section chains close to the left end of the plate 20, where they contact with the coating material to the best advantage, since all of the material that escapes from the plate 20 over into the tank 1 in that direction must pass this place; and also, the chains have the minimum distance to travel from here up to the top, into contact with the confections, and therefore the less chance to drop the material picked up. This is also true of the cooling or hardening section at the right end of the plate 20; which, in addition, could not cooperate with the plate 20 as simply if it had its sprocket wheels at its right-hand end, at which and for the major part of its length it is over the drip-trough bottom which has no supply of coating to deliver to the chains, but merely the drippage from the coated confections traveling thereover on the top stretch of the conveyor section. The heater 23 keeps this drippage warm and fluid enough to flow back into the tank 1 as before described.

The conveyor driving shaft 52 is journaled in bearings 52' in the conveyor frame bars 13 and has fixed on it a conveyor-driving sprocket wheel 53 with the main driving sprocket chain 54 passing around it and around the main driving sprocket wheel 55 fixed on the main driving shaft 8, before mentioned. The shaft 52 also has fixed on it the two sprocket wheels 56 and 57 with chains 58 and 59, respectively, passing around them and around sprocket wheels 60 and 61 on the main-section sprocket shaft 45 and on the main-section roller shaft 46, respectively. Thus the main conveyor section is driven. The main-section sprocket shaft 45 has a second sprocket wheel 62 fixed on it with a chain 63 passing around it and around a sprocket wheel 64 fixed on the dusting-section sprocket or driving shaft 34, which, at the opposite side of the conveyor has fixed on it another sprocket wheel 65 with a chain 66 passing around it and around a sprocket wheel 67 fixed on the dusting-section roller shaft 38. These drive the dusting section of the conveyor. The main section driving shaft 45 has, at this other side of the conveyor, a third sprocket wheel 68 with a chain 69 passing around it and around a sprocket wheel 70 fixed on the cooling or hardening section driving shaft 49, which has, at the near side of the conveyor, a second sprocket wheel 71 fixed on it with a chain 72 passing around it and around a sprocket wheel 73 fixed on the roller shaft 50 of this section. In this way the cooling or hardening section of the conveyor is driven.

As before stated, the roller shafts 38, 46 and 50 are preferably driven positively, as by the chains 59, 66 and 72, so as to avoid friction between the conveying chains 32, 43 and 47 and these roller shafts, respectively. But these chains will to some extent rotate these roller shafts without positive driving thereof, so that the chains 59, 66 and 72 may in some cases be dispensed with. The dusting operation is also of minor importance, compared with the main coating, bottoming and hardening operations of the main and third sections, and the machine may therefore have the first or dusting section eliminated, with the feed belt 6 passing the confection centers directly onto the main or middle section. When present however, the first section intervenes between the main section and the feed belt 6 with the result that the coating being brought up from the distributing plate 20 is kept off the feed belt 6; and therefore this first section has that function aside from its preliminary dusting function. Where this element is not present as a chain conveyor, but merely as an intervening element of some kind, this fending function will still be performed.

All of the chains 32, 43 and 47 are supported at intervals by small supporting roller shafts 74, 75 and 76 respectively, journaled in the conveyor frame bars 13 and extending across the frame. Also, these chains are kept in slightly spaced relation at their roller shafts 38, 46 and 50, respectively, by small collars 77, 78 and 79; and the driving sprocket wheels 33, 44 and 48 have collars 80, 81 and 82 between them, on their shafts 34, 45 and 49, respectively. Minor details such as these are preferable in the present example, but variations from these may occur under different conditions.

In the modification shown in Fig. 3, instead of the plate 20 the distributing means is an endless web 20', which will be understood to be as wide as the conveyor, which runs around a driving roller 83 fixed on a shaft 84 journaled in a bracket 17'. The shaft 84 has, outside this bracket 17', a sprocket wheel 85 with a sprocket chain 86 passing around it and around a sprocket wheel 87 fixed on the main shaft 52 of the conveyor. The web 20' hangs down from its driving device thus constituted, and dips into the main supply of coating material in the tank 1', and, as the device is driven simultaneously with the conveyor the web 20' brings up some of this material and applies it to the under side of the conveyor, that is, to the lower stretch of the main-section just before it passes up to its upper stretch. The bracket 17' is held on the side of the tank 1' by clamp screws 19' passing through slots 88 in the tank side, so that this entire distributing or applying means is adjustable toward or from the conveyor to vary the amount of material applied thereto. This example differs also in having the dusting section 26' and the main section 27' with their chains 32' and 43' under tension in their upper stretches, by having the driving sprockets, as the dusting-section sprocket 33', at the delivery ends and the roller shafts, as the main section roller shaft 46', at the receiving ends of the respective sections. The gate 29 is applied as in the other example, as are also the other parts of the machine, not shown in Fig. 3.

The coating material carried up by the chains 43 or 43' from the plate 20 or web 20', as the case may be, meets the on-coming confection, which is deposited thereon, avoiding reliance merely on a running under of some of the material dropped on the chains, and producing a more adequate coating of the confection bottom. The center B, thus coming onto the material A (Fig. 6) tilts slightly as shown, in the gap between the conveyor sections. This gap is due to the necessary convexity of the rotary means around which the flexible conveyor elements pass, and the necessity of having the driving rotary means of proper driving diameter. Such tilting at this place, however, is beneficial, because during the momentary stoppage of the center, by tilting down against the up-coming coating, the first or dusting conveyor section has a slight rubbing or abrading action on the bottom of the confection center, which roughens it, as indicated, and facilitates the clinging of the coating material thereto as soon as the center is lifted up and carried on by the rising and advancing coating material on the main section. During its occupancy of the main conveyor section, in its travel under the flood of coating material from the fountain or coating trough 4, by which its top and sides are coated as usual, this confection is practically supported on the coating material that came up from the plate 20, and not directly by the conveyor element. Therefore, when it is ready to leave this main section, to go onto the cooling section, it carries with it, as its bottom coating, the portion of coating material upon which it was deposited as it came onto the middle section, and on which it has rested and with which it has had time to form intimate junction during its travel with the main section.

Then, in the passage from the main to the cooling section, as the confection C is in Fig. 6, the confection, now coated on top, sides and bottom, does not tilt down and become momentarily stopped or retarded as at first, because here the middle or main conveyor section, travelling down with its not totally depleted coating layer, opposes this layer to that being brought up by the third or cooling section from the plate 20. The result is a tide of the coating material in the gap between the main and the cooling section, as at D in Fig. 6, on which the coated confection practically floats across the gap from one section to the other.

This third or cooling section of the conveyor, being outside the machine frame, less subject to the heat of the main supply of coating material, permits the coated confection to cool; and at the same time, with its coating carried up from the plate 20, it further conserves or adds to the bottom coating of the confection. Owing to the coolness, this coating further applied to the bottom of the confection will be especially firmly and fully attached to the confection; so that when the confection finally passes from this section onto the delivery belt 7, the bottom coating is heavy and firm enough not to be squeezed out from under the confection by the weight of the confection itself, and not to unduly adhere to the belt or to the plaque or other means provided there for receiving the completed confection, and upon which, as is usual, the confection is carried for some distance exposed to the air, so that the coating receives its final hardening permitting the confection to be handled freely.

These functions are present with a coating that is softened by heating, as just described, but they are also practically realized with any other coating, as for instance a solution or paste that hardens merely by exposure to the air, since the third section more fully exposes the confection to this hardening influence, whether it be cooling, drying or chemical action, than does the main section inside the machine. It will be understood that machines of this character have some kind of means, like a cabinet, of which the frame forms a part, by which the inside of the machine may be practically closed off from the outer atmosphere, so that the cooling, drying or other hardening operation on the coating or upon the confection itself, is practically confined to the exterior of the machine. It is in a situation of this kind that the function of the third or cooling or hardening section 28 of the conveyor has its best exemplification.

By the herein described combination, the confections are freed from dust, such as fine sugar or starch particles or other loose substances, while carried by the first section 26, due to the vibration incident to its travel, then on the second or main section 27 they receive their coating, not only on top and sides, but on the bottom; and on the third or hardening section 27, the hardening is facilitated because this section is distinct from and free from the influences that affect the main section 27. The projection of the inner end of the dust-pan up between the adjacent ends of the sections 26 and 27 prevents appreciable escape of the dust and the like onto the main section 27; and the open inner end of the drip-trough 22 allows the drippings from the coated confections to pass back into the tank 1.

By having the respective conveyor sections made up of a plurality of parallel endless chains, it is feasible to have these chains of relatively heavy material, and therefore strong and durable and presenting a practically level conveying surface; whereas a web continuous from side to side as well as length wise must be of comparatively light material, such as wire, which is found in practice to warp and twist so that the conveyor is not level or uniform, and is so weak that it soon wears out and breaks frequently, necessitating stoppage of the entire coating system until it can be repaired. To make such a continuous web of such relatively heavy material as these chains are made of is to impose unequal strains in different parts, due to the unavoidable slight inaccuracy of the various parts of such a continuous structure, which would result in a conveyor that would be warped and twisted in the making, and which would pass very stiffly around the supporting rotary elements. By having the chains separate, as in my present invention, each chain can adjust itself to its own supporting means, independently of the others, and these discrepancies do not become manifest.

Such a heavy conveying element as this chain is especially applicable to the combination in which it is most feasible to have the upper stretches of the chains pass from their driving sprockets to their idler rollers, because its great strength allows it to be stretched very tight without breakage, so that the upper stretch is practically straight although not the tension stretch. Such an arrangement, thus permitted, therefore lends the advantages set forth herein in the proper arrangement of the larger and smaller rotary supporting means of the chains relative to each other. But this chain may be used in various other relations, and other constructions may be employed for the sectional conveyor, as has been alluded to herein. Other modifications will occur in practice.

It will be understood, therefore, that I am not limited to the example herein specifically disclosed, but what I claim as new and desire to secure by Letters Patent is:

1. In a machine of the character described, a conveyor having a confection-receiving side, and having openings for passage of coating material downwardly through said conveyor, means for driving said conveyor, means for dropping coating material on said side of said conveyor, and means for catching some of said material and reapplying the caught material directly to said side of said conveyor, whereby some of said reapplied material is applied to the bottoms of confections placed on said reapplied material and some of the dropping material is applied to the upper parts of said confections.

2. In a machine of the character described, an endless conveyor having openings for passage of coating material downwardly therethrough, and having an upper conveying stretch and a single lower returning stretch, means for driving said conveyor, means for dropping coating material on said conveyor, and means lying close to the lower side of said lower stretch, for catching some of said material and reapplying the caught material to said lower side of said lower stretch, to be presented upward on said upper stretch as the conveyor travels, whereby some of said reapplied material is applied to the bottoms of confections placed on said upwardly presented reapplied material on said upper stretch and some of said dropping material is applied to the upper parts of said confections.

3. In a machine of the character described, a conveyor, means for driving said conveyor, means for dropping coating material on said conveyor, means for reapplying some of said material to said conveyor, whereby some of said reapplied material is applied to the bottoms of confections placed on said reapplied material and some of the dropping material is applied to the upper parts of said confections, and means for subjecting said confections, with said material thereon, to influences acting to harden said material and for applying an additional amount of said material to said bottoms under said hardening influences.

4. In a machine of the character described, a conveyor, means for dropping coating material on said conveyor, means for reapplying some of said material to said conveyor, said conveyor comprising traveling means having a structure loose enough to vibrate incident to its travel, for carrying confections while loose substance becomes removed therefrom due to vibration of said traveling means and for depositing said confections on said reapplied material, whereby some of said reapplied material is applied to the bottoms of said confections and some of the dropping material is applied to the upper parts of said confections, and means for driving said conveyor, adapted to vibrate said loose structure.

5. In a machine of the character described, a conveyor, means for dropping coating material on said conveyor, means for reapplying some of said material to said conveyor, said conveyor comprising traveling means having a structure loose enough to vibrate incident to its travel, for carrying confections while loose substance becomes removed therefrom due to vibration of said traveling means and for depositing said confections on said reapplied material, whereby some of said reapplied material is applied to the bottoms of said confections and some of the dropping material is applied to the upper parts of said confections, means for excluding said loose substance from said means for reapplying said material to said conveyor, and means for driving said conveyor, adapted to vibrate said loose structure.

6. In a machine of the character described, a conveyor comprising a series of parallel chains and means for guiding said chains, means for dropping coating material on said conveyor, means for reapplying some of said material to said conveyor, and means for depositing confections on said reapplied material, whereby some of said reapplied material is applied to the bottoms of said confections and some of the dropping material is applied to the upper parts of said confections.

7. In a machine of the character described, a main conveyor section made up of a series of parallel chains and means for guiding and driving said chains, means for dropping coating material on said conveyor section, means for reapplying some of said material to said conveyor section, means for depositing confections on said reapplied material, whereby some of said reapplied material is applied to the bottoms of said confections and some of the dropping material is applied to the upper parts of said confections, and a distinct conveyor section made up similarly to said main section for subjecting said confections, with said material thereon, to influences acting to harden said material.

8. In a machine of the character described, a main conveyor section made up of a series of parallel chains and means for guiding and driving said chains, means for dropping coating material on said conveyor section, means for reapplying some of said material to said conveyor section, and a distinct conveyor section made up similarly to said main section, for carrying confections while loose substance becomes removed therefrom and for depositing said confections on said reapplied material, whereby some of said reapplied material is applied to the bottoms of said confections and some of the dropping material is applied to the upper parts of said confections.

9. In a machine of the character described, a main conveyor section made up of a series of parallel chains and means for guiding and driving said chains, means for dropping coating material on said conveyor section, means for reapplying some of said material to said conveyor section, a distinct conveyor section made up similarly to said main section, for carrying confections while loose substance becomes removed therefrom and for depositing said confections on said reapplied material, whereby some of said reapplied material is applied to the bottoms of said confections and some of the dropping material is applied to the upper parts of said confections, and another distinct conveyor section made up similarly to said main section, for subjecting said confections, with said material thereon, to influences acting to harden said material.

10. In a machine of the character described, a conveyor having an overrunning conveying stretch and an underrunning returning stretch, means for driving said conveyor, means for dropping coating material on said conveyor, and a distributing element under said underrunning stretch, extending throughout the major part of the area of said conveyor and extending close to a part of said underrunning stretch, to catch and reapply to said underrunning stretch some of said coating material as it drops from said conveyor, whereby said reapplied material is presented upwardly on said overrunning stretch and confections may be deposited on said reapplied material and some of said reapplied material is thus applied to the bottoms of said confections and some of said dropping material is applied to the upper parts of said confections.

11. In a machine of the character described, a conveyor comprising side bars, means mounted to travel between said bars, in conveying direction in an upper path and in return direction in a lower path, a distributing element extending across the major part of the space between said bars, under the lower path of travel of said means, bars extending across said space, under said element, fixed to said side bars, means on said bars that extend across, adjustable up and down and engaging the lower side of said element, thereby supporting said element for adjustment toward or away from said path of travel, and means for dropping coating material on said means that travels, to run therefrom and be caught by said element, whereby some of said material is reapplied to said means while traveling in its lower return path and whereby confections may be placed on said reapplied material as the means travels in its upper path, so that some of said reapplied material is applied to the bottoms of said confections and some of said dropping material is applied to the upper parts of said confections, the adjustment of said element serving to vary the amount of said material applied to said bottoms.

12. In a machine of the character described, a conveyor comprising endless flexible means, rotary driving means around which said flexible means passes with its upper stretch driven thereby in conveying direction, and rotary guiding and supporting means of less diameter than said driving means, around which said upper stretch passes to the lower stretch, a distributing element under said conveyor close to said flexible means where it passes from said lower to said upper stretch, and means for dropping coating material on said conveyor and on said distributing element.

13. In a machine of the character described, a main conveyor section made up of endless flexible means, rotary driving means around which said flexible means passes with its upper stretch driven thereby in conveying direction, and rotary guiding and supporting means of less diameter than said driving means, around which said upper stretch passes to the lower stretch, a distributing element under said conveyor section close to said flexible means where it passes from said lower to said upper stretch, means for dropping coating material on said conveyor section and on said distributing element, and a distinct conveyor section made up of endless flexible means, rotary driving means around which said flexible means passes with its upper stretch driven thereby in conveying direction, and rotary guiding and supporting means of less diameter than said driving means, this latter means being adjacent to said rotary driving means of said main section, whereby a gap is left between said sections, and whereby confections carried by said distinct section tilt down into said gap, thereby being retarded momentarily to have their bottoms abraded by said distinct section, in passing across said gap onto said main section.

14. In a machine of the character described, a main conveyor section made up of endless flexible means, rotary driving means around which said flexible means passes with its upper stretch driven thereby in conveying direction, and rotary guiding and supporting means of less diameter than said driving means, around which said upper stretch passes to the lower stretch, a distributing element under said conveyor section close to said flexible means where it passes from said lower to said upper stretch, means for dropping coating material on said conveyer section and on said distributing element, whereby part of the coating material is reapplied by said distributing element to said conveyor section, means for depositing confections on said reapplied material, and a distinct conveyor section made up of endless flexible means, rotary driving means around which said flexible means passes close to the rotary guiding and supporting means of said main section, leaving a gap between the two sections, and said flexible means passing therefrom in conveying direction in its upper stretch, rotary guiding and supporting means for this distinct section, of less diameter than its rotary driving means, around which said endless means passes from its upper to its lower stretch, said rotary driving means of this distinct section carrying said section close to said distributing element in passing from the lower to the upper stretch of said section.

15. In a machine of the character described, adjacent conveyor sections each comprising endless flexible means passing around rotary means at their adjacent ends, with the flexible means passing in a single conveying direction in their upper stretches, means for dropping coating material on the first section in the order of said travel, means for catching part of said material and applying it to both of said sections, whereby advancing coating material on said first section meets up-coming coating material on the second section, forming a flood in the gap between said sections, upon which confections are carried across said gap, and whereby some of said coating material applied to said sections is applied to the bottoms of said confections and some of the drooping coating material is applied to the upper parts of said confections, and means for driving said sections as aforesaid.

16. In a machine of the character described, means for heating coating material, a conveyor section over said means, elevating means to raise said material and drop it on said conveyor section, means for driving said section, means for supplying confections to said section, a distinct section, removed from the direct influence of said heating means, receiving said confections from the aforesaid section, and allowing them to cool, and means to apply additional material to the confection bottoms as they pass from one section to the other.

17. In a machine of the character described, in combination with coating-supply means, a conveyor comprising a series of parallel chains and means for guiding and driving said chains.

18. In a machine of the character described in combination with coating-supply means, a conveyor comprising a series of parallel stud-and-link sprocket chains and means for guiding and driving said chains.

19. In a machine of the character described, a conveyor carrying confections and having openings for passage of coating material downwardly through said conveyor, means for dropping coating material on said conveyor, distributing means receiving some of this coating and applying the received coating to said conveyor outside the limits of its conveying extent, to be brought by said conveyor within said limits and there applied to the bottoms of said confections, and means for driving said conveyor.

20. In a machine of the character described in combination with coating-supply means, a conveyor comprising a series of parallel endless chains, rotary driving means around which said chains pass with their upper stretches driven thereby in conveying direction, and rotary guiding and supporting means of less diameter than said driving means, around which said upper stretches pass to the lower stretches.

21. In a machine of the character described in combination with coating-supply means, a conveyor comprising a series of parallel endless chains, rotary driving means around which said chains pass with their upper stretches driven thereby in conveying direction, rotary guiding and supporting means of less diameter than said driving means, around which said upper stretches pass to the lower stretches, and means for adjustably supporting said driving means and said guiding and supporting means in separated position, to stretch said chains.

22. In a machine of the character described, a plurality of successive conveyor sections each having openings for passage of substance downwardly therethrough, one of which is adapted to receive confections directly from another one of said sections and to receive coating material to be applied to said confections on said one section, and means for driving all of said sections continuously and in unison, in conveying direction.

23 In a machine of the character described, a coating conveyor section having openings for passage of substance downwardly therethrough, and a distinct conveyor section to which the coated confections are directly delivered by said coating section, having passages for drippage from the confections downwardly therethrough, and upon which said confections are subjected to hardening influences.

24. In a machine of the character described, a conveyor comprising a traveling section having a structure loose enough to vibrate incident to its travel on which the confections are freed from loose substance due to the vibration of said section, a succeeding section on which said confections are coated, a third section on which said confections have their coatings hardened, and means for driving said conveyor, adapted to vibrate said loose structure.

25. In a machine of the character described, a conveyor having a side carrying confections, means having a surface near to said side of said conveyor, means whereby said surface receives a supply of coating material which is exposed thereon for a substantial interval of time and presented thereby to said side of said conveyor to be scraped from said surface by said side of said conveyor and thereby applied to the bottoms of said confections in a thickened consistency due to the exposure on said surface, and means for driving said conveyor.

26. In a machine of the character described, a plurality of successive conveyor sections, means for driving said sections in uniform direction, means for dropping coating material on one of said sections, and means whereby coating material is applied to a section succeeding the one section in driving direction.

27. In a machine of the character described, a plurality of successive conveyor sections, means for driving said sections in uniform direction, means for dropping coating material on one of said sections, and means whereby coating material is applied to said one section in additional amount, and whereby coating material is also applied to a section succeeding the one section in driving direction.

28. In a machine of the character described, a conveyor section, means to apply coating to said section, supporting and feeding means to carry confections toward said conveyor section, and means between said supporting and feeding means and said conveyor section to exclude coating material from said supporting and feeding means.

29. In a machine of the character described, a conveyor section, feeding means with a carrying side substantially in the plane of said section to carry confections toward said conveyor section, means to apply coating to said conveyor section to be carried up between said conveyor section and said feeding means, and means between said conveyor section and said feeding means to exclude said coating from said feeding means.

30. In a machine of the character described, a plurality of conveyor sections one of said sections having a structure loose enough to vibrate, and carrying confections to free the confections of loose substance due to its vibration and delivering said confections to the succeeding section, means to apply coating material to said succeeding section, means between said sections for excluding coating material from the one section and excluding loose substance from the other section, and means for driving said sections, adapted to vibrate the loose structure thereof.

JOHN MASSARELLA.